United States Patent
Chaki et al.

(10) Patent No.: US 11,846,175 B2
(45) Date of Patent: Dec. 19, 2023

(54) ESTIMATING RESERVOIR PRODUCTION RATES USING MACHINE LEARNING MODELS FOR WELLBORE OPERATION CONTROL

(71) Applicant: Landmark Graphics Corporation, Houston, TX (US)

(72) Inventors: Soumi Chaki, Bengaluru (IN); Honggeun Jo, Austin, TX (US); Terry Wong, Spring, TX (US); Yevgeniy Zagayevskiy, Calgary (CA); Dominic Camilleri, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 548 days.

(21) Appl. No.: 17/136,895

(22) Filed: Dec. 29, 2020

(65) Prior Publication Data

US 2022/0205354 A1 Jun. 30, 2022

(51) Int. Cl.
*E21B 47/022* (2012.01)
*E21B 47/12* (2012.01)
(Continued)

(52) U.S. Cl.
CPC .......... *E21B 47/022* (2013.01); *E21B 47/138* (2020.05); *G01V 1/46* (2013.01);
(Continued)

(58) Field of Classification Search
CPC ......... E21B 47/02; E21B 47/138; G01V 1/46; G01V 1/48
(Continued)

(56) References Cited

U.S. PATENT DOCUMENTS 8,776,895 B2 * 7/2014 Li ........................... G06F 30/28
703/10
10,620,339 B2 * 4/2020 Ramsay ............... G01V 99/005
(Continued)

FOREIGN PATENT DOCUMENTS

WO 2020219057 A1 10/2020

OTHER PUBLICATIONS

Amini et al., "Application of Machine Learning and Artificial Intelligence in Proxy Modeling for Fluid Flow in Porous Media", Jul. 9, 2019, 17 pages.
Datadvance, "PSeven;", retrieved from internet on Jan. 12, 2021, 8 pages.
Halliburton, "Nexus Reservoir Simulation Software", Jan. 12, 2021, 3 pages.
(Continued)

*Primary Examiner* — George B Bennett
(74) *Attorney, Agent, or Firm* — Kilpatrick Townsend & Stockton LLP

(57) ABSTRACT

A system is described for estimating well production and injection rates of a subterranean reservoir using machine learning models. The system may include a processor and a non-transitory computer-readable medium comprising instructions that are executable by the processor to cause the processor to perform various operations. The processor may receive a set of static geological data about at least one subterranean reservoir in a subterranean formation. The processor may apply a trained convolutional neural network to the set of static geological data and data on initial states of dynamic reservoir properties to determine dynamic outputs of the subterranean reservoir. The processor may determine well data by extracting the set of static geological data and the dynamic outputs at well trajectories. And, the processor may apply a trained artificial neural network to the well data and subterranean grid information about the subterranean reservoir to generate estimated well production and injection rates.

20 Claims, 9 Drawing Sheets

(51) Int. Cl.
 *G01V 1/46* (2006.01)
 *G01V 1/48* (2006.01)
 *G06N 3/08* (2023.01)

(52) U.S. Cl.
 CPC ............... *G01V 1/48* (2013.01); *G06N 3/08* (2013.01); *E21B 2200/20* (2020.05)

(58) Field of Classification Search
 USPC .......................................................... 33/304
 See application file for complete search history.

(56) References Cited

U.S. PATENT DOCUMENTS

| | | | | |
|---|---|---|---|---|
| 11,609,352 | B2* | 3/2023 | Denli | G01V 1/48 |
| 11,675,100 | B2* | 6/2023 | Pattnaik | G01V 1/282 |
| | | | | 702/17 |
| 2009/0182694 | A1 | 7/2009 | Boulatsel et al. | |
| 2010/0217574 | A1 | 8/2010 | Usadi et al. | |
| 2013/0073272 | A1 | 3/2013 | Wallace et al. | |
| 2019/0025461 | A1 | 1/2019 | Wiener et al. | |
| 2021/0140298 | A1* | 5/2021 | Bakulin | E21B 49/003 |
| 2021/0270127 | A1* | 9/2021 | Zhu | G06N 3/047 |

OTHER PUBLICATIONS

Halliburton, "Reservoir Development Lifecycle Management", Jan. 12, 2021, 5 pages.
Hoonyoung et al., "A Learning-Based Data-Driven Forecast Approach for Predicting Future Reservoir Performance", 2018, 15 pages.
Negash et al., "Artificial Neural Network and Inverse Solution Method for Assisted History Matching of a Reservoir Model", 2017, 11 pages.
Peters et al., "Results of the Brugge Benchmark Study for Flooding Optimization and History Matching", Jun. 2010, 15 pages.
Ronneberger et al., "U-Net: Convolutional Networks for Biomedical Image Segmentation", Computer Science Department and BIOSS Centre for Biological Signalling Studies, Available Online at: https://arxiv.org/pdf/1505.04597.pdf, May 18, 2015, 8 pages.
Schlumberger, "MEPO Multiple Realization Optimizer", Jan. 12, 2021, 4 pages.
Tang et al., "A Deep-Learning-Based Surrogate Model for Data Assimilation in Dynamic Subsurface Flow Problems", Aug. 16, 2019, 47 pages.
PCT/US2020/067418, "International Search Report and Written Opinion", dated Sep. 29, 2021, 10 pages.

* cited by examiner

ESTIMATING RESERVOIR PRODUCTION RATES USING MACHINE LEARNING MODELS FOR WELLBORE OPERATION CONTROL

TECHNICAL FIELD

The present disclosure relates generally to subterranean formation modeling for well operations and, more particularly (although not necessarily exclusively), to estimating production and injection rates of wells in subterranean hydrocarbon reservoirs using machine learning models for well operation control.

BACKGROUND

A subterranean formation can include a subterranean reservoir. The subterranean reservoir may store hydrocarbons, water, and the like. Various operations, such as exploration operations and production operations, may perform tasks with respect to the subterranean formation. The tasks can include, among other various tasks, modeling the subterranean reservoir to determine whether or how to drill and form a well in the subterranean reservoir. But, modeling the subterranean reservoir with conventional techniques may be computationally-expensive and may result in excessive use of valuable computational time and resources.

DETAILED DESCRIPTION

Figure 1:
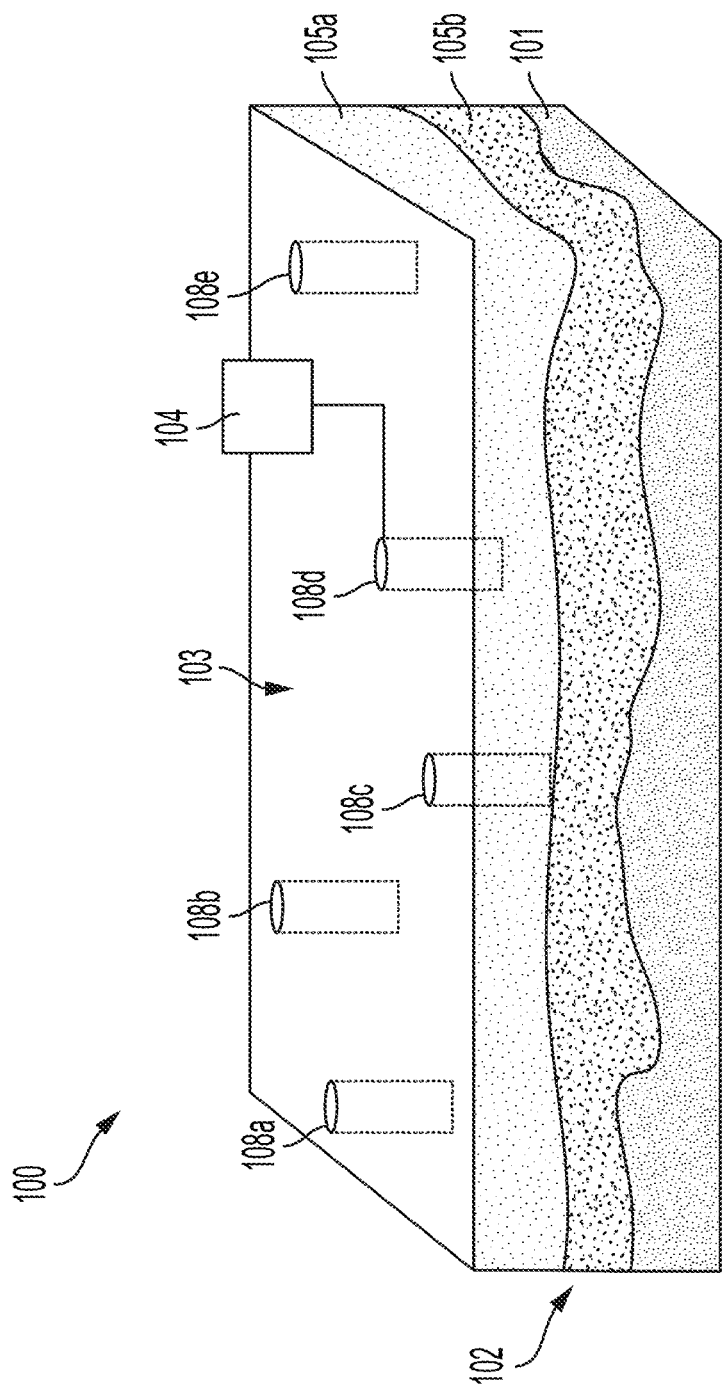
FIG. 1 is a cross-sectional side view of a subterranean formation having at least one subterranean reservoir according to one example of the present disclosure.

Certain aspects and examples of the present disclosure relate to estimating hydrocarbon well production rates in a subterranean reservoir using machine learning models. The well production rates may be used for modeling the subterranean reservoir for exploration operations, production operations, or other suitable operations relating to the subterranean reservoir. The machine learning models may include a convolutional neural network (CNN), a deep neural network (DNN), a recurrent neural network (RNN), a combination thereof, or other deep learning or machine learning models. Other suitable machine learning models may be used for estimating the well production and injection rates. The well production rates may include cumulative oil production (COP), cumulative water production (CWP), cumulative gas production (CGP), oil production rate (OPR), water production rate (WPR), gas production rate (GPR), a combination thereof, or other suitable well production rates for modeling the subterranean reservoir. The well injection rates may include cumulative water injection (CWI), water injection rate (WIR), cumulative gas injection (CGI), gas injection rate (GIR), a combination thereof, or other suitable well injection rates. The well production and injection rates may be estimated for one location, such as an individual well, included in the subterranean hydrocarbon reservoir. In some examples, the well and injection production rates can be estimated by the computing device for a subset of locations, such as a field of wells, included in the subterranean hydrocarbon reservoir. The well production and injection rates can be used to control operation of one or more wells such as improving accuracy of existing reservoir models, planning a new well in the subterranean reservoir, adjusting a trajectory of a drilling operation that is forming a wellbore in the subterranean reservoir, and the like.

Geologists and reservoir engineers can develop a petroleum reservoir simulation model and run the simulation model many times for various realizations. The realizations may correspond to varied scenarios for obtaining a solution space for uncertainty analysis of reservoir characteristics in a reservoir management system. But running the simulations for a complex, three-dimensional (3D) reservoir model with a large number of grid-blocks may not be practical due to high computational time.

To overcome this computational inefficiency, reservoir engineers may use a proxy flow simulator to accurately estimate reservoir behavior in a more efficient manner. A deep-learning based, proxy-flow modeling framework for estimating gridded dynamic properties can be used to model a reservoir. Further, the reservoir model can be leveraged during an estimation of production and injection rates for individual wells or fields of the reservoir model. The proxy-flow model can approximate the solution of a full-physics numerical reservoir simulator with enhanced computational efficiency and can be used for different tasks such as history matching, field development optimization, uncertainty quantification, and the like. A large number of simulations can be run and results can be analyzed for assimilating more information into the subterranean reservoir model and, thus, reduce uncertainty associated with the model or assess various development scenarios. In turn, the developed subterranean reservoir model can be more accurate and improve overall profitability of reservoir development.

An accurate proxy-flow model can be developed to estimate the gridded dynamic properties, such as pressure, phase saturations, and the like, and production and injection rates for field or individual wells using deep learning algorithms. Leveraging the deep learning algorithms may result in reduced computational time when compared to running a full-physics numerical simulator. For example, the full-physics numerical simulator can take days to run simulations for a complex 3D reservoir model. As such, using the full-physics numerical simulator may not be a practical approach when running a large number of simulations repeatedly or in parallel to carry out history matching, production optimization, uncertainty quantification, or other reservoir engineering tasks.

The proxy-flow model may provide an approximate solution of the full-physics numerical flow simulation with significantly reduced computational time. The proposed deep-learning-based proxy-flow model can be trained with the input and output of the several full-physics numerical flow simulator runs being training and testing datasets representing multiple data realizations of a reservoir model. The trained proxy-flow models can mimic the behavior of the full-physics flow simulator by learning underlying governing physics such as mass balance flow equations with constraints. Different types of input and output variables of the subterranean reservoir model can be considered. The input variables may represent time-invariant, static reservoir model data, such as porosity, absolute permeability, rock compressibility, fracture network properties, and the like. Further, the input variables may represent reservoir fluid properties that are temperature and pressure dependent, such as fluid compressibility, density, and viscosity. Input variables may also represent properties that are interactions between rocks and fluids, such as relative permeability and capillary pressure. The output variables can consider time-variant dynamic reservoir model data such as reservoir pressures and fluid saturations of points on a grid or time-variant well and field production data that include oil, gas, or water production and injection rates, reservoir fluid cumulative production and injection rates, average reservoir pressure and bottom-hole pressure at the wells and the like.

Gridded dynamic properties, such as pressure, fluid-phase saturations, phase compositions, etc., can be projected from time-invariant static properties like porosity and permeability and from gridded dynamic properties from previous time states using a deep-learning model such as the CNN. An additional deep learning algorithm such as the DNN or the RNN, can be applied to portions of an output of the CNN to develop a proxy-flow model for the well production and injection rates. In this case, input data may be static, gridded data, such as porosity and permeability, and dynamic, gridded data, such as saturation and pressure, that are generated by the CNN. Output data can include well production rates at certain locations along the wellbore. The described proxy-flow model may reduce computational time which can lead to a reduced decision-making time of reservoir engineers for better management of reservoirs and reservoir resources. The reduction in the computation time can be more significant for a larger 3D reservoir. The computation time required to run this data-driven, artificial intelligence-based technique can be further reduced by running it in an HPC environment, a GPU environment, or a cloud environment.

A connection can be established between gridded, static and dynamic properties of the reservoir with multiple production data for wells by using a two-stage process. The data-driven deep-learning-based proxy-flow model may be similar or identical to outcomes of a full-flow physics-based simulator with reduced computational time. In a first-stage, the proxy-flow model can approximate a gridded dynamic output, such as pressure or fluid saturation, from static properties, such as porosity, permeability, and gridded dynamic output properties from previous time step by using a CNN variant called U-Net. In a second stage, the DNN or the RNN can use portions of the gridded dynamic output to estimate well production rates. The proxy-flow model can approximate values with accuracy by being trained using a training dataset generated from a smaller number of full-flow, physics-based numerical simulations. The reservoir engineers, by using the model, can make fast and informed decisions regarding the reservoir for an improved reservoir management system.

In an example, one or more stochastic geo-models may be applied to a subset of raw seismic data, well logs, and core data associated with portions of the subterranean reservoir. The stochastic geo-models may output gridded static data, such as porosity and permeability, of the portions of the subterranean reservoir. A small number of full-physics-based flow simulations can be run on the subset of static data to generate a subset of dynamic data associated with the portions of the subterranean reservoir. The subset of static data and the subset of dynamic data may be used as training data to train an untrained CNN. The U-Net, or other variant of the CNN, model can be trained to estimate dynamic reservoir properties, such as pressure or fluid saturation, in future states from static properties, such as porosity and permeability, and dynamic properties at the current state for a layer. Parameters of separate U-Net models can be calibrated through training and testing for each grid layer of a 3D reservoir model. Upon successful training and testing of the U-Net models, different metrics, such as correlation coefficient (CC), root mean square error, and absolute error mean, may be checked, and visualization of the U-Net model against the full-physics flow simulator results can be compared. Once the U-Net parameters are calibrated, the trained U-Net models can be used to estimate dynamic outputs for additional realizations of static geological properties and a first few states of associated dynamic properties of the reservoir model. Additionally, the trained U-Net models can be used to perform computationally-intensive reservoir management workflows for sensitivity analysis on reservoir data, history matching, and optimization of production.

The DNN or RNN may be trained to estimate well production and injection rates from U-Net-based estimated reservoir pressure, saturation, and subterranean grid information, such as fluid transmissibility in the X-direction (TX), fluid transmissibility in the Y-direction (TY), fluid transmissibility in the Z-direction (TZ), reference reservoir pore volume (PVR), horizontal permeability (KH), simulation time (T in days), and the like. The parameters of the DNN or RNN can be saved upon successful completion of training and testing. In an example in which new geological models or realizations are available, pressure and saturation over the reservoir area can be estimated from porosity and permeability and initial states of gridded dynamic properties using the saved U-Net parameters. Subsequently, the well production and injection rates can be estimated from the approximated dynamic pressure, saturation along the well trajectories, and available grid-based static information using the saved DNN or RNN parameters. For this example, the new models may be similar to the models which are used to generate the training data for the CNN and the DNN or RNN.

The CNN input can include various data inputs that include dynamic gridded pressure or saturations at a current state and static porosity and permeability values of gridblocks of a computational mesh. The output of the CNN may include one output value that is represented by grid values of pressure or saturations at a subsequent time step. That is, the pressure or saturation values at a time step after the current state. The proposed neural network based proxy-flow model may capture the behavior of fluid flow equations and associated constraints of the flow process inherently. As a result, the outputs of the proxy-flow model may closely mimic the output of the full-physics flow simulator.

After estimating pressure and saturations over a subset of the reservoir area using the CNN, the DNN or RNN model can be developed to yield a functional relationship between well production and injection rates and estimated variables. The estimated variables can include pressure, saturations, compositions, and grid-based information including TX, TY, TZ, PVR, KH, simulation time, and the like. Unlike porosity and permeability, PVR, TX, TY, and TZ may incorporate a geometry of grid blocks in the reservoir, which makes PVR, TX, TY, and TZ suitable candidates for use in estimating production and injection rates. For each well, and for each of the target variables such as COP, CWP, oil production rate OPR, and WPR, a separate DNN or RNN can be used. The architecture and parameters of each individual DNN or RNN, such as the number of hidden layers, number of neurons in each layer, activation function, optimization algorithm, etc., may be tuned to obtain optimum performance. For example, for a first production well, a single hidden-layer DNN with 300 neurons that uses a hyperbolic tangent activation function can be modeled with a single neuron in the output layer with a linear activation function. The number of trainable parameters may be around 3000 and the parameters can be tuned using the Adam optimization algorithm or other suitable optimization algorithms. The model may include eight input nodes pertaining to each of the estimator attributes: pressure, oil saturation, KH, PVR, TX, TY, TZ, and simulation time.

Based on the performances achieved by the deep learning algorithms, such as the CNN and the DNN or RNN, the designed proxy-flow modeling framework can be used as an alternative to full-physics simulators efficiently. In some examples, different RNN architectures can be used. The RNN architectures, or variants, may replicate the physics-based simulator more closely when compared to the DNN. With a trained, AI-based proxy-flow model, users can estimate the well production and injection rates or reservoir pressure or saturation changes with much lower expensive computational costs. With a cloud environment deployed, the described workflow can be implemented once the described workflow is coupled with high-performance computing techniques. Moreover, users may save costs by using the multiple processors of the cloud environment to train the AI-based proxy-flow model, and then applying fewer computational resources to use the AI-based proxy-flow model to perform computationally-intense tasks, such as history matching, optimization, sensitivity analysis, and the like.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional side view of a subterranean formation 100 having at least one subterranean reservoir 101 according to one example of the present disclosure. The subterranean formation 100 may include an underground region 102 and a surface region 103. The underground region 102 may be formed of various strata 105*a-b* that can include different materials (e.g., rock, soil, oil, water, or gas) and vary in thickness and shape. Wells 108*a-e* may be drilled into the strata 105, or the wells 108*a-e* may be planned for drilling into the strata 105. In an example, the wells 108*a-e* may be used to access the reservoir 101 from the surface region 103 to produce hydrocarbons from the reservoir 101.

A computing device 104 can be positioned at the surface 103 of the subterranean formation 100 or elsewhere (e.g., offsite). The computing device 104 may be in communication with sensors or other electronic devices used for well planning and exploration. For example, the computing device 104 can include a communication interface, or be communicatively coupled to a communications device, for transmitting information to and receiving information from another communication interface of an exploration subsystem. The information may include data about the subterranean formation 100 such as porosity or permeability of the subterranean reservoir 101 in the subterranean formation 100. The data may be used by the computing device 104 to estimate production rates for the subterranean reservoir 101 or for the well 108.

Although one computing device 104 is depicted in FIG. 1, in other examples, more than one computing device can be used, and, together, the multiple computing devices can perform operations such as those described in the present disclosure. The computing device 104 is depicted in FIG. 1 as being positioned at the surface 103, but, in other examples, the computing device 104 can be positioned belowground, aboveground, onsite, in a vehicle, offsite, etc.

In some examples, the computing device 104 can include a communication device. The communication device can represent one or more of any components that facilitate a network connection. For example, the communications device can allow the computing device 104 to interface with other devices via a wired connection. But, in other examples, the communication device can allow the computing device 104 to interface with other devices wirelessly and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device can use acoustic waves, surface waves, vibrations, optical waves, or induction (e.g., magnetic induction) for engaging in wireless communications. In an example in which the communication device is wired, the communications device can include interfaces such as Ethernet, USB, IEEE 1394, or a fiber optic interface. In an example with at least one other computing device, the computing device 104 can receive wired or wireless communications from the other computing device and perform one or more tasks based on the communications.

The computing device 104 may use the data to estimate production rates at one location in the subterranean reservoir 101, and in some examples, the computing device 104 may estimate production or injection rates at more than one location in the subterranean reservoir 101. The production rates may include cumulative oil production (COP), cumulative water production (CWP), oil production rate (OPR), water production rate (WPR). Other well characteristics may include water injection rate (WIR), bottom-hole pressure (BHP), cumulative gas production (CGP), gas production rate (GPR), a combination thereof, or other suitable well properties for modeling the subterranean reservoir. In some examples, alternative to the computing device 104 estimating the production rates, the computing device 104 may transmit the data to an offsite facility (not shown) for estimating the production rates. In this example, the offsite facility may transmit the estimated production rates to the computing device 104. In response to determining or receiving the estimated production rates in the well 108 or the subterranean reservoir 101, the computing device 104 may output the estimated production rates. The estimated production rates may be displayed by the computing device 104 for viewing by an operator, or a supervisor, of the operation. The estimated production rates may be used to model the wells 108 or the subterranean reservoir 101 or for performing other tasks related to production or exploration of the subterranean formation 100. In some examples, the computing device 104 may additionally or alternatively determine proxy flow models that can be used for assisted history matching, field development optimization, uncertainty quantification, and the like.

Figure 2:
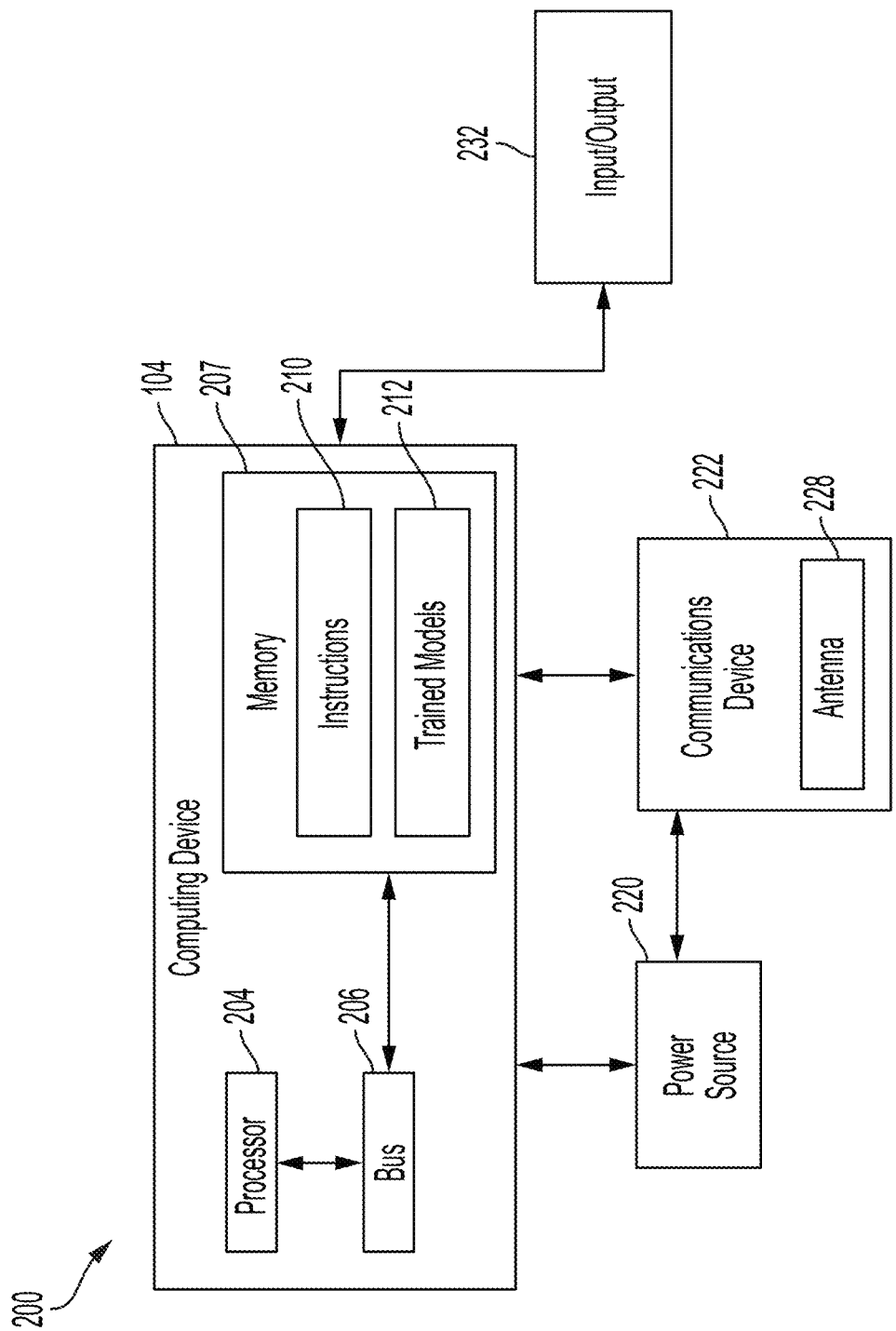
FIG. 2 is a block diagram of a computing system for using machine learning models to estimate production rates in a subterranean reservoir according to one example of the present disclosure.

FIG. 2 is a block diagram of a computing system 200 for using machine learning models to estimate production rates in the subterranean reservoir 101 according to one example of the present disclosure. The components shown in FIG. 2, such as the computing device 104, power source 220, communications device 222, etc., can be integrated into a single structure. For example, the components can be within a single housing. In other examples, the components shown in FIG. 2 can be distributed via separate housings or otherwise, and in electrical communication with each other.

The system 200 may include the computing device 104. The computing device 104 can include a processor 204 interfaced with other hardware via a bus 206. A memory 207, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 104. In some aspects, the computing device 104 can include input/output interface components (e.g., a display, printer, keyboard, touch-sensitive surface, and mouse) and additional storage.

The memory can include instructions 210, and the processor 204 can execute one or more operations included in the instructions 210 for estimating production rates in the subterranean reservoir 101. For example, the processor 204 can estimate production rates in the wells 108 or in the subterranean reservoir 101 by executing trained models 212 on data about the subterranean reservoir 101. The data can include static data and dynamic data. The trained models 212 may be included in the memory 207 and may include a CNN, a DNN, an RNN, or any other suitable trained machine-learning model for estimating the production rates. The instructions 210 may include other suitable instructions for estimating production rates in the subterranean reservoir 101. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may be non-volatile and may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computing system 200 can include a power source 220. The power source 220 can be in electrical communication with the computing device 104 that may include a communications device 222. In some examples, the power source 220 can include a battery or an electrical cable (e.g., a wireline). The power source 220 can include an AC signal generator. The computing device 104 can operate the power source 220 to apply a transmission signal to an antenna 228, in an example in which the communications device 222 is operating in a wireless mode, to forward data relating to the subterranean formation 100, etc. to other systems. For example, the computing device 104 can cause the power source 220 to apply a voltage with a frequency within a specific frequency range to the antenna 228. This can cause the antenna 228 to generate a wireless transmission. In other examples, the computing device 104, rather than the power source 220, can apply the transmission signal to the antenna 228 for generating the wireless transmission.

In some examples, part of the communications device 222 can be implemented in software. For example, the communications device 222 can include additional instructions stored in memory 207 for controlling functions of the communications device 222. The communications device 222 can receive signals from remote devices and transmit data to remote devices. For example, the communications device 222 can transmit wireless communications that are modulated by data via the antenna 228. In some examples, the communications device 222 can receive signals (e.g. associated with data to be transmitted) from the processor 204 and amplify, filter, modulate, frequency shift, or otherwise manipulate the signals. In some examples, the communications device 222 can transmit the manipulated signals to the antenna 228. The antenna 228 can receive the manipulated signals and responsively generate wireless communications that carry the data.

The computing system 200 can include an input/output interface 232. The input/output interface 232 can connect to a keyboard, pointing device, display, and other computer input/output devices. An operator may provide input using the input/output interface 232. Additionally or alternatively, the operator may view outputs from the computing device 104 on the input/output interface 232. The estimated production rates of the subterranean reservoir 101 may be displayed to the operator on the input/output interface 232. The displayed production rates can provide an advisory function to the operator, or to the supervisor, of an operation using the computing system 200, either of whom can make adjustments to the operation based on the displayed production rates. In one example, in response to viewing the estimated production rates, the operator may generate a model of the subterranean reservoir 101 for a hydrocarbon exploration operation, or other similar operation, and may recommend or not recommend drilling a hydrocarbon well into the subterranean reservoir 101 for extracting produced hydrocarbon based on the estimated production rates.

Figure 3:
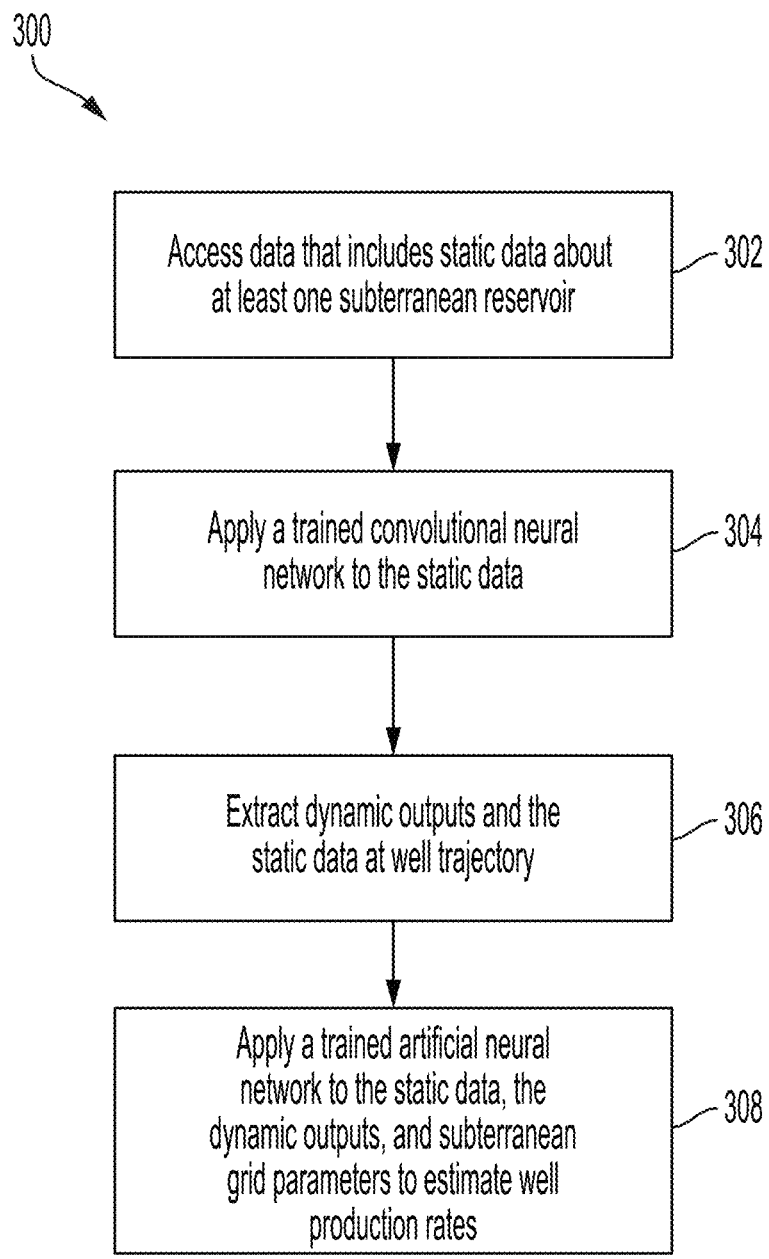
FIG. 3 is a flowchart of a process for estimating production rates in a subterranean reservoir using machine learning models according to one example of the present disclosure.

FIG. 3 is a flowchart of a process 300 for estimating production rates in the subterranean reservoir 101 using machine learning models according to one example of the present disclosure. At block 302, the process 300 involves accessing a set of static geological data about the subterranean reservoir 101. The geological data may include indications of permeability and porosity of the subterranean reservoir 101. The indications may be pre-processed by the computing device 104 from raw geological data collected from the subterranean reservoir 101. The geological data may be static data that may include seismic data, well log data, core data, etc.

At block 304, the process 300 involves applying a trained CNN to the set of geological data and initial states of dynamic reservoir properties. The trained CNN may be trained to generate dynamic outputs from the set of geological data and dynamic outputs from previous time step. The dynamic outputs may include pressure and fluid saturation of the subterranean reservoir 101. The dynamic outputs may, unlike the static data, change over time. For example, for a certain subterranean reservoir 101, indications of permeability and porosity in the subterranean reservoir 101 may remain constant over a pre-set time period while the pressure and fluid saturation in the subterranean reservoir 101 may increase or decrease over the pre-set time period.

At block 306, the process 300 involves extracting information about the subterranean reservoir 101 at well trajectories. The extracted information can include the set of geological data, the dynamic outputs, or other suitable information about the subterranean reservoir 101. The well trajectories at which the information is extracted can include trajectories at which potential wells can be drilled in the subterranean reservoir 101, such as at the locations of the wells 108a-e. Each well trajectory of the well trajectories may correspond to a different set of static geological data and different dynamic outputs.

At block 308, the process 300 involves applying a trained artificial neural network (ANN) to the set of static geological data, the dynamic outputs, and subterranean grid information. The trained ANN can include the DNN, the RNN, a combination thereof, or other suitable ANN for determining the production rates. The subterranean grid information may include directional fluid transmissibility, a reference pore volume, a horizontal permeability or other suitable information relating to the subterranean reservoir 101. The computing device 104 may output estimates of the well production rates in response to applying the trained ANN to the static geological data, the dynamic outputs, and the subterranean grid information. The well production rates may differ based on corresponding well trajectories and well locations. The well production rates may be used for controlling a wellbore operation such as operating existing wellbores, planning a new wellbore in the subterranean reservoir 101, adjusting a trajectory of a drilling operation that is forming a wellbore in the subterranean reservoir 101, and the like. The computing device 104 may additionally apply the trained ANN to the set of static geological data, the dynamic outputs, and subterranean grid information to determine well injection rates. The well injection rates may include cumulative oil injection, cumulative water injection, oil injection rate, and water injection rate.

Figure 4:
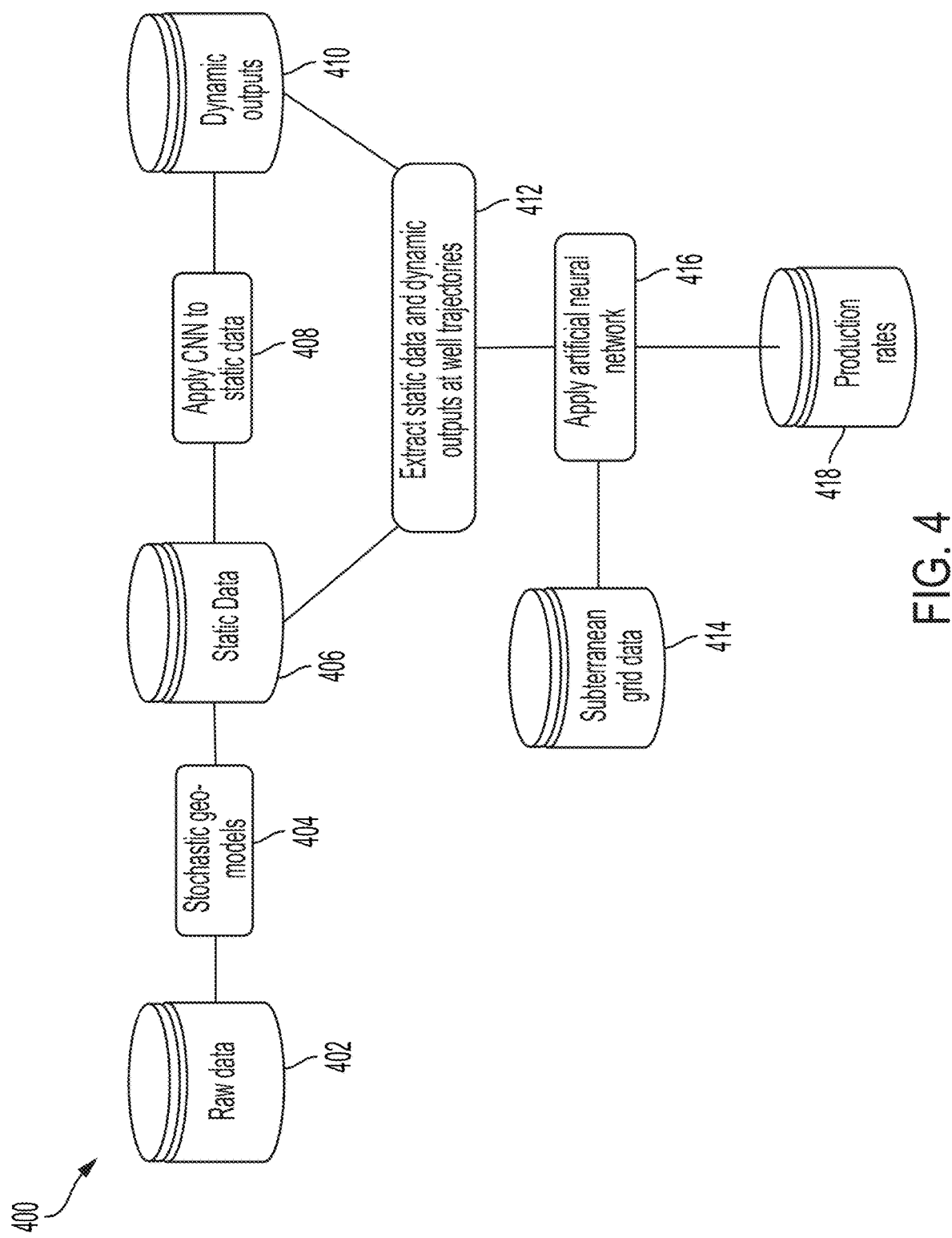
FIG. 4 is a flow diagram for estimating production rates in a subterranean reservoir using machine learning models according to one example of the present disclosure.

FIG. 4 is a flow diagram 400 of data and operations during the process 300 for estimating the production rates in the subterranean reservoir 101 using the machine learning models according to one example of the present disclosure. The flow diagram 400 may additionally include data and operations for determining well injection rates. As shown in FIG. 4, raw geological data 402 may represent the data generated from sampling of the subterranean reservoir 101. Additionally or alternatively, the raw geological data 402 may include well data, geologic information of a reservoir area, and the like. One or more stochastic geo-models 404 may be applied to the raw geological data 402 to generate a set of gridded static data 406. In some examples, the computing device 104 may receive, or otherwise access, the stochastic geo-models 404 from a geological database or other computing device. The computing device 104 may process the raw data 402 to generate the set of static data 406, which may include static data such as porosity and permeability indications of the reservoir 101, that may be the set of geological data received at the block 302.

The gridded static data 406 may be an input to the trained CNN, and at block 408, the computing device 104 may apply the trained CNN to the gridded static data 406. By applying the trained CNN to the static data 406, the computing device 104 may determine gridded dynamic outputs 410. The gridded dynamic outputs 410 may include pressure and fluid saturation in the subterranean reservoir 101. In an example, the trained CNN may be trained by a process described below with respect to FIG. 5.

Similar to block 306, at block 412 of FIG. 4, the static data 406 and the dynamic outputs 410 can be extracted at the well trajectories within the subterranean reservoir 101. Other information suitable for determining the production rates can additionally or alternatively be extracted at the well trajectories. The well trajectories at which the static data 406 and the dynamic outputs 410 are extracted can include trajectories of potential wells that may be drilled in the subterranean reservoir 101 in the future.

At block 416, the trained ANN can be applied to the static data 406 and the dynamic outputs 410 extracted from the well trajectories and also to subterranean grid information 414 associated with the reservoir 101. The subterranean grid information 414 may include directional fluid transmissibility, a reference pore volume, a horizontal permeability, or other suitable information relating to the subterranean reservoir 101. Applying the trained ANN to the static data 406, the dynamic outputs 410, and the subterranean grid information 414 at the block 416 may allow the computing device to determine well production rates 418 associated with the well trajectories. The well production rates 418 can include COP, CWP, OPR, WPR, or other suitable well production rates. The well production rates 418 may represent rates at one location in the subterranean reservoir 101. In some examples, the computing device 104, by using the trained CNN and the trained ANN, can output or otherwise determine the well production rates 418 for a subset of the locations included in the subterranean reservoir 101 or at more than one well trajectory. For example, the computing device 104 may generate the well production rates 418 for each of the locations of the wells 108a-e, as described above with respect to FIG. 1. The well production rates 418 may be used in hydrocarbon exploration operations, hydrocarbon production operations, or other suitable operations that use the well production rates 418. By incorporating CNN predicted pressure and fluid saturation values into ANN models of well rates, the accuracy of the constructed proxy flow model for well rate estimations may increase.

Figure 5:
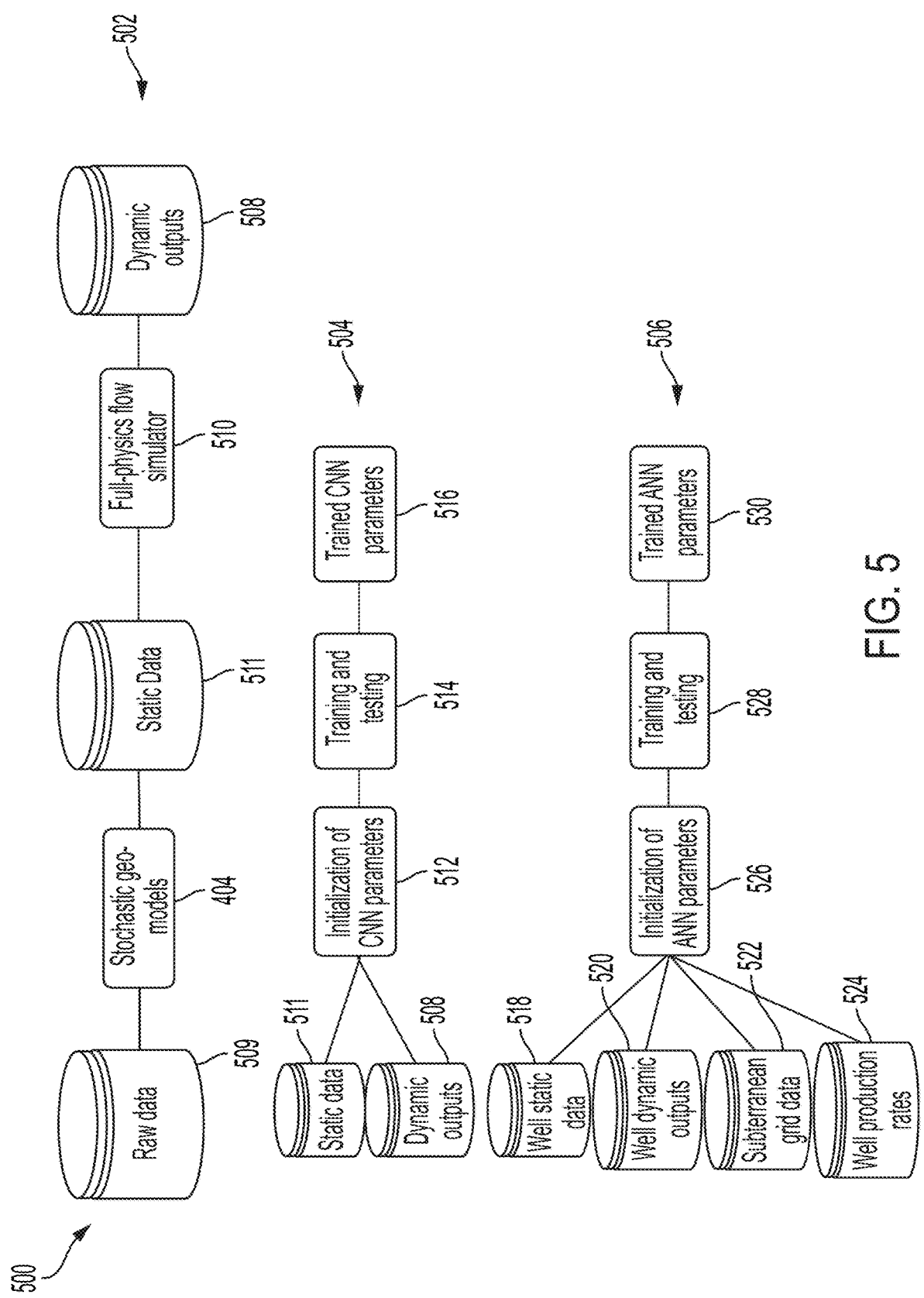
FIG. 5 is a flow diagram for training machine learning models to estimate production rates in a subterranean reservoir according to one example of the present disclosure.

FIG. 5 is a flow diagram 500 for training machine learning models to estimate the well production rates 418 in the subterranean reservoir 101 according to one example of the present disclosure. The flow diagram 500, as illustrated, includes three stages 502, 504, and 506. The stage 502 may include a process or other type of operation for determining dynamic outputs 508 from raw geological data 509 using a full-physics flow simulator 510. The stage 504 may include a process or other type of operation for training a CNN, and the stage 506 may include a process or other type of operation for training an ANN.

In the stage 502, the computing device 104 may receive or otherwise access the raw geological data 509. The raw geological data 509 may be determined from one or more seismic surveys, well logs, and core data collected from the subterranean reservoir 101. Additionally or alternatively, the raw geological data 509 may include well data, geologic information of a reservoir area, and the like. In some examples, the raw geological data 509 may be used in conjunction with geo-modeling algorithms to build multiple realizations of gridded static properties of the synthetic multi-layered Brugge reservoir model of a subterranean reservoir. The raw geological data 509 may subsequently be processed by the computing device 104 by applying one or more stochastic geo-models 404 to the raw geological data 509 to generate gridded static data 511. The gridded static data 511 may include indications of permeability and porosity in the subterranean reservoir 101. The computing device 104 may apply a full-physics flow simulator 510 to the static data 511 to determine the gridded and well dynamic outputs 508. In some examples, the full-physics flow simulator 510 can determine the dynamic outputs 508 by applying physics-based equations, such as mass balance flow equations with constraints, to the static data 511.

In the stage 504, the static data 511 and the dynamic outputs 508 are used to train the CNN. At block 512, the computing device 104 can initialize parameters of the CNN. The parameters of the CNN at the block 512 may be untrained upon initialization of the CNN such that the CNN is not initially able to produce accurate or valuable results when applied to data. At block 514, the computing device 104 can train and test the CNN using the static data 511 and the dynamic outputs 508. The computing device 104 may run a set of iterations for determining trained CNN parameters, and after each iteration, the computing device 104 may test the parameters of the CNN to determine whether the parameters are trained. For example, the CNN may be trained to take the static data 511 and output the corresponding dynamic outputs 508 associated with the static data 511. Upon completion of the training process, the computing device 104 may store trained CNN parameters 516 for subsequent use. In some examples, the static data 511, the dynamic outputs 508 determined by the full-physics flow simulator 510, or a combination thereof can be determined from a subset of available data about the subterranean reservoir 101 for training the CNN.

In the stage 506, well static data 518, well dynamic outputs 520, subterranean grid data 522, and well production rates 524 may be used to train the ANN. The well static data 518 and the well dynamic outputs 520 may be the static data 511 and the dynamic outputs 508 extracted at the well trajectories, respectively. The subterranean grid data 522 may include directional fluid transmissibility, a reference pore volume, a horizontal permeability or other suitable information relating to the subterranean reservoir 101. And, the well production rates 524 may include historical data or simulated data from full-physics flow simulator about well production rates of existing wells of the training data. The historical data may be included in at least one geological database about existing or offset wells in the subterranean reservoir 101. In some examples, the geological database may include historical data about existing or offset wells in other subterranean reservoirs. The geological database can be accessed by the computing device 104 for accessing the well production rates 524.

At block 526 of the stage 506, the computing device 104 can initialize parameters of the ANN. The parameters of the ANN at the block 526 may be untrained upon initialization of the ANN such that the ANN is not initially able to produce accurate or valuable results when applied to data. At block 528, the computing device 104 can train and test the ANN using the well static data 518, the well dynamic outputs 520, the subterranean grid data 522, and the well production rates 524. The computing device 104 may run a set of iterations for determining trained ANN parameters, and after each iteration, the computing device 104 may test the parameters of the ANN to determine whether the parameters are trained. For example, the ANN may be trained to take, as inputs, the well static data 518, the well dynamic outputs 520, the subterranean grid data 522 and output the corresponding well production rates 524 associated with the well trajectories. Upon completion of the training process, the computing device 104 may store trained ANN parameters 530 for subsequent use.

Figure 6:
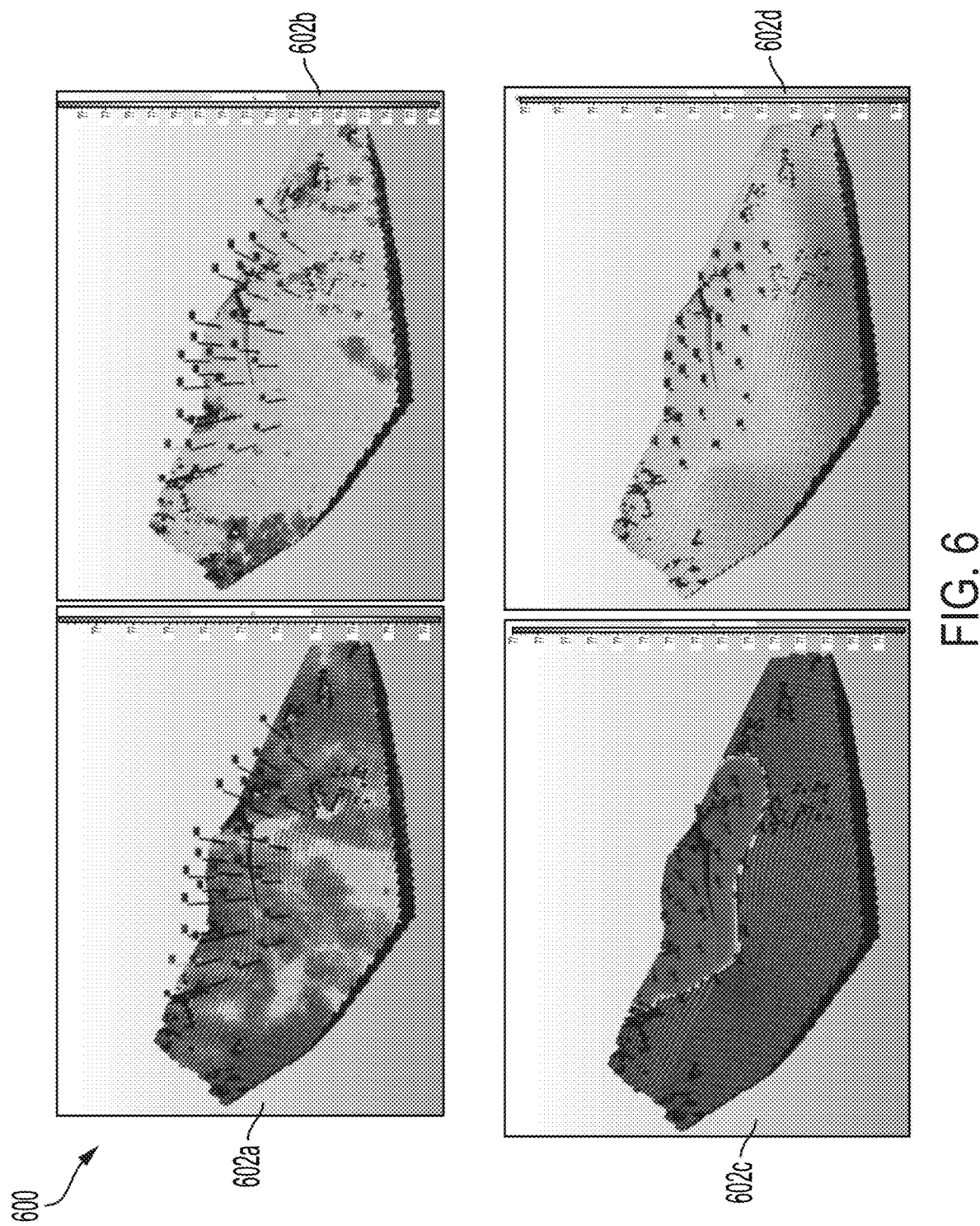
FIG. 6 is a graph of inputs and outputs of a trained convolutional neural network that can be used to estimate well production rates in the subterranean reservoir according to one example of the present disclosure.

FIG. 6 is a graph 600 of inputs and outputs of the trained CNN that can be used to estimate the well production rates 418 in the subterranean reservoir 101 according to one example of the present disclosure. The graph 600 includes four plots 602a-d, and each plot may display different information about the subterranean reservoir 101. The plot 602a may represent a porosity field of the subterranean reservoir 101. Porosity can be a measure of void spaces within the subterranean reservoir 101. Additionally, the plot 602b may represent a permeability field of the subterranean reservoir 101. Permeability may be a measure of an ability of the subterranean reservoir 101 to transmit fluid. The plots 602a-b may represent the static data that can be used as an input to the trained CNN for determining the dynamic outputs 410. The computing device 104 may determine the porosity field, the permeability field, or both, of the subterranean reservoir 101 via one or more stochastic geo-models 404 of FIG. 4. In some examples, the porosity field and the permeability field may represent the static data 406 of the flow diagram 400. The computing device 104 may subsequently output the porosity field on the plot 602a and the permeability field on the plot 602b for viewing by the operator.

The plot 602c may represent oil saturation in the subterranean reservoir 101 after a pre-set period of time. The oil saturation may be a measure of an amount of oil per unit volume within the subterranean reservoir 101. The plot 602d may represent a pressure field in the subterranean reservoir 101 after the pre-set period of time. The plots 602c-d may represent the dynamic outputs 410 that are determined by applying the trained CNN to the static data 406 and previous states of predicted dynamic outputs. In some examples, the pre-set period of time may be identical for the plots 602c-d; as illustrated, the pre-set time period of the plots 602c-d is 120 days. Other suitable pre-set time periods may be used by the computing device 104, and in some examples, the plots 602c-d may include different pre-set periods of time. The computing device 104 may determine the oil saturation and the pressure in the subterranean reservoir 101 by applying the trained CNN to the porosity field and the permeability field. In some examples, the oil saturation and the pressure in the subterranean reservoir 101 may represent the dynamic outputs 410 of the flow diagram 400. The computing device 104 may subsequently output the oil saturation on the plot 602c and the pressure on the plot 602d for viewing by the operator. In some examples, the trained ANN can be applied to data displayed by the computing device 104 on the plots 602a-d to estimate the well production rates 418.

Figure 7:
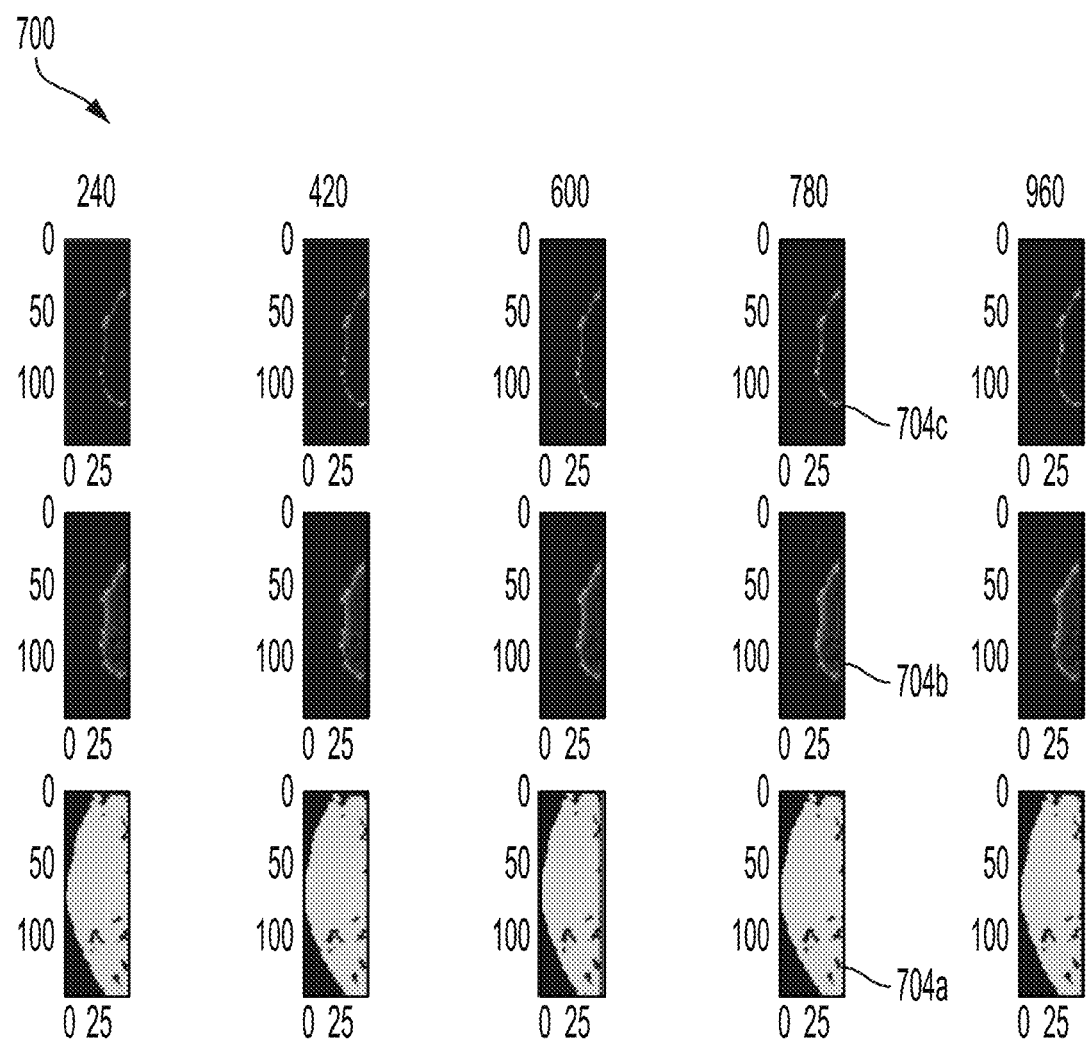
FIG. 7 is a set of output graphs from machine learning models and full-physics models according to one example of the present disclosure.
Figure 7:
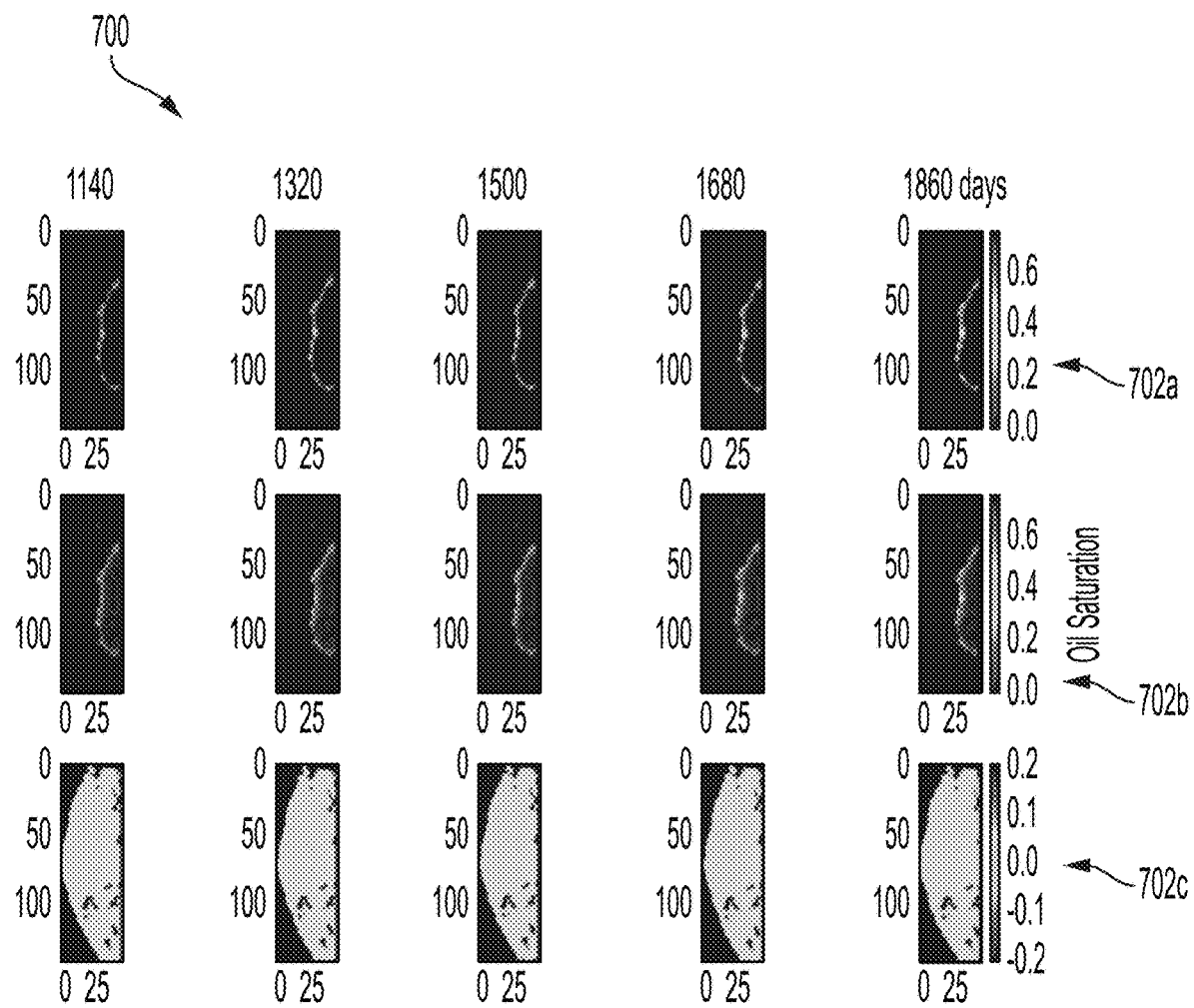

FIG. 7 is a set of output graphs 700 from the trained CNN and from full-physics models according to one example of the present disclosure. Outputs displayed on the output graphs 700 can include the dynamic outputs 410, such as pressure in a certain layer of the subterranean reservoir 101. As illustrated in FIG. 7, the output graphs 700 include three sets of plots 702*a-c*. The plot 702*a* may represent an output from the machine learning models including the trained CNN. The plot 702*b* may represent an output from the full-physics flow model. And, the plot 702*c* may represent a measure of error between values of the plot 702*a* and of the plot 702*b*. Each plot of the plots 702*a-c* may include sub-plots (e.g., sub-plots 704*a-c*) that display information at different time intervals. Each sub-plot may display information relating to the subterranean reservoir 101. For example, the sub-plot 704*a*, as illustrated on the output graphs 700, displays pressure values of one layer of the subterranean reservoir 101 as determined by the machine learning models. Additionally, the sub-plot 704*b*, as illustrated on the output graphs 700, displays pressure values of one layer of the subterranean reservoir 101 as determined by the full-physics flow model. The sub-plot 704*c*, as illustrated on the output graphs 700, displays the error between the sub-plots 704*a* and 704*b*. In some examples, the error may be determined using a root-mean-square error analysis. The output graphs 700 may show that the machine learning models produce similar or identical results to the full-physics flow model while using less resources. Accordingly, the output of the trained CNN may be used by the trained ANN to accurately estimate the well production rates 418 of the subterranean reservoir 101.

Figure 8:
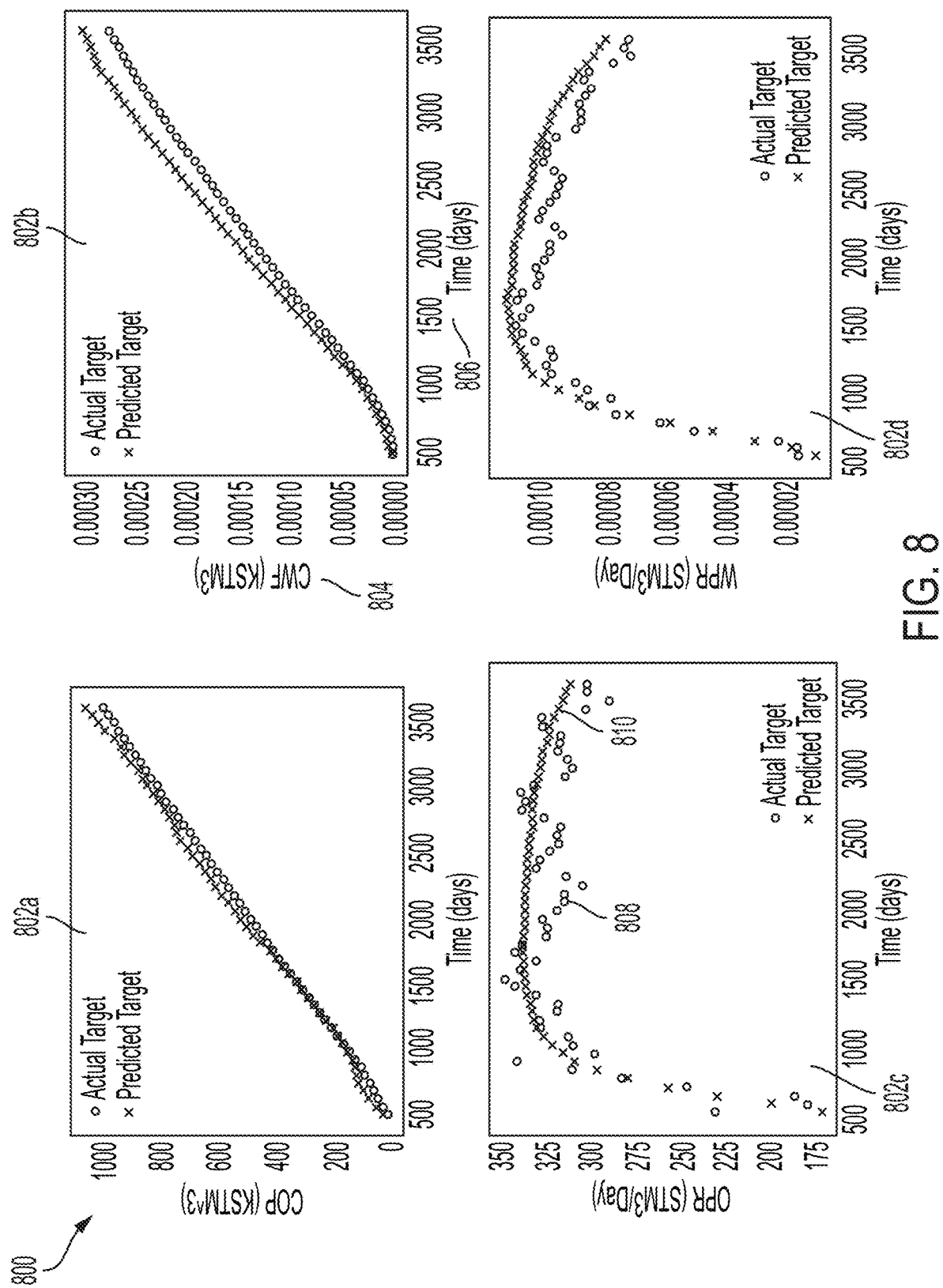
FIG. 8 is an example of a set of graphs showing targets from a full-physics flow model and targets from machine learning models according to one example of the present disclosure.

FIG. 8 is an example of a set of graphs 800 showing targets from a full-physics flow model and targets from machine learning models according to one example of the present disclosure. The set of graphs 800 may include plots 802*a-d* that show the targets from a full-physics flow model and the targets from machine learning models for various production rates. The plots may include a vertical axis 804 and a horizontal axis 806 that represent a production rate and time, respectively. The plot 802*a* may represent the targets for COP, the plot 802*b* may represent the targets for CWP, the plat 802*c* may represent the targets for OPR, and the plot 802*d* may represent the targets for WPR. Other suitable plots may be included in the graphs 800 for showing production or injection rate targets for the full-physics flow model and the machine learning models. As illustrated on the plots 802, dots 808 represent the targets for the full-physics flow model and crosses 810 represent the targets for the machine learning models. Based on the plots 802, the dots 808 and the crosses 810 include similar values, which may imply that the machine learning models can output well production rates with similar accuracies to the full-physics flow model.

In some aspects, systems, methods, and non-transitory computer-readable mediums for estimating production rates in a subterranean reservoir using machine learning models are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving a set of static geological data that includes indications of permeability and porosity of at least one subterranean reservoir in a subterranean formation; applying a trained convolutional neural network to the set of static geological data and initial states of dynamic reservoir properties to determine dynamic outputs that include reservoir pressure and reservoir fluid saturations of at least one subterranean reservoir; determining well data by extracting the set of static geological data and the dynamic outputs at well trajectories; and applying a trained artificial neural network to the well data and subterranean grid information of at least one subterranean reservoir to generate estimated well production an injection rates for use in controlling a wellbore operation.

Example 2 is the system of example 1, wherein the instructions are further executable by the processor to cause the processor to perform operations comprising: accessing an untrained convolutional neural network; accessing static data that includes indications of permeability and porosity, fluid property data, and rock property data of a portion of at least one subterranean reservoir, and dynamic outputs that include pressure and saturations of the portion of at least one subterranean reservoir; and training the untrained convolutional neural network by iteratively processing and mapping the static data to the dynamic outputs.

Example 3 is the system of example 2, wherein the dynamic outputs are generated by applying a full-physics flow model to the static data of the portion of at least one subterranean reservoir.

Example 4 is the system of example 2, wherein the instructions are further executable by the processor to cause the processor to perform operations comprising: accessing an untrained artificial neural network; accessing well static data that includes indications of permeability and porosity extracted at well trajectories from the set of static geological data of the portion of the at least one subterranean reservoir, well dynamic outputs that include pressure and saturation extracted at well trajectories from the dynamic outputs of the portion of the at least one subterranean reservoir, subterranean grid information of the portion of the at least one subterranean reservoir, production rates that include cumulative oil production, cumulative water production, oil production rate, and water production rate of the portion of the at least one subterranean reservoir, and injection rates that include cumulative oil injection, cumulative water injection, oil injection rate, and water injection rate of the portion of at least one subterranean reservoir; and training the untrained artificial neural network by iteratively processing and mapping the well static data, the well dynamic outputs, and the subterranean grid information to the production rates.

Example 5 is the system of any of examples 1-4, wherein the subterranean grid information comprises a directional well transmissibility, a reference pore volume, simulation time, grid assignments of fluid, rock, capillary pressure, and relative permeability properties, or a combination thereof.

Example 6 is the system of any of examples 1-5, wherein the well trajectories include a plurality of well trajectories for potential wells in at least one subterranean reservoir, and wherein each well trajectory of the plurality of well trajectories corresponds to different sets of static geological data, dynamic outputs, and well production and injection rates.

Example 7 is the system of any of examples 1-6, wherein the estimated well production rates are production rates and injection for at least one well location included in at least one subterranean reservoir.

Example 8 is the system of any of examples 1-7, wherein the trained artificial neural network comprises a trained recurrent neural network or a trained deep neural network.

Example 9 is a method comprising: receiving a set of static geological data that includes indications of permeability and porosity of at least one subterranean reservoir in a subterranean formation; applying a trained convolutional neural network to the set of static geological data and initial states of dynamic reservoir parameters to determine dynamic outputs that include reservoir pressure and reservoir fluid saturations of tat least one subterranean reservoir; determining well data by extracting the set of static geological data and the dynamic outputs at well trajectories; and applying a trained artificial neural network to the well data and subterranean grid information of at least one subterranean reservoir to generate estimated well production rates for use in controlling a wellbore operation.

Example 10 is the method of examples 9, further comprising: accessing an untrained convolutional neural network; accessing static data that includes indications of permeability and porosity, fluid property data, and rock property data of a portion of the at least one subterranean reservoir, and dynamic outputs that include pressure and saturations of the portion of the at least one subterranean reservoir; and training the untrained convolutional neural network by iteratively processing and mapping the static data to the dynamic outputs.

Example 11 is the method of example 10, wherein the dynamic outputs are generated by using a full-physics flow model that uses the static data as inputs.

Example 12 is the method of example 10, further comprising: accessing an untrained artificial neural network; accessing well static data that includes indications of permeability and porosity extracted at well trajectories from the set of static geological data of the portion of at least one subterranean reservoir, well dynamic outputs that include pressure and saturations extracted at well trajectories from the dynamic outputs of the portion of the at least one subterranean reservoir, subterranean grid information of the portion of the at least one subterranean reservoir, production rates that include cumulative oil production, cumulative water production, oil production rate, and water production rate of the portion of the at least one subterranean reservoir, and injection rates that include cumulative gas injection, cumulative water injection, gas injection rate, and water injection rate of the portion of the at least one subterranean reservoir; and training the untrained artificial neural network by iteratively processing and mapping the well static data, the well dynamic outputs, and the subterranean grid information to the production rates.

Example 13 is the method of any of examples 9-12, wherein the subterranean grid information comprises a directional well transmissibility, a reference pore volume, simulation time, grid assignments of fluid, rock, capillary pressure, and relative permeability properties, or a combination thereof.

Example 14 is the method of any of examples 9-13, wherein the well trajectories include a plurality of well trajectories for potential wells in at least one subterranean reservoir, and wherein each well trajectory of the plurality of well trajectories corresponds to different sets of static geological data, fluid, rock, capillary pressure, and relative permeability data, dynamic outputs, and well production rates.

Example 15 is the method of any of examples 9-14, wherein the estimated well production rates are production rates for at least one well location included in the at least one subterranean reservoir, and wherein the trained artificial neural network comprises a trained recurrent neural network or a trained deep neural network.

Example 16 is a non-transitory computer-readable medium comprising program code that is executable by a processor for causing the processor to: execute a trained convolutional neural network on a set of static geological data of at least one subterranean reservoir for determining dynamic outputs of at least one subterranean reservoir; and execute a trained artificial neural network on well static data extracted from the set of static geological data at well trajectories of at least one subterranean reservoir, well dynamic outputs extracted from the dynamic outputs at the well trajectories, and subterranean grid information of at least one subterranean reservoir for determining estimated well production and injection rates of at least one subterranean reservoir for use in controlling a wellbore operation.

Example 17 is the non-transitory computer-readable medium of example 16, further comprising program code that is executable by the processor for causing the processor to train: a convolutional neural network using static data of a portion of at least one subterranean reservoir and dynamic outputs of the portion of at least one subterranean reservoir from a full-physics flow model to generate the trained convolutional neural network; and an artificial neural network using well static data that is extracted at well trajectories from the static data of the portion of at least one subterranean reservoir extracted, well dynamic outputs that are extracted at well trajectories from the dynamic outputs of the portion of at least one subterranean reservoir, subterranean grid information of the portion of at least one subterranean reservoir, historical well production rate data of the portion of at least one subterranean reservoir, and historical well injection rate data of the portion of at least one subterranean reservoir to generate the trained artificial neural network.

Example 18 is the non-transitory computer-readable medium of any of examples 16-17, wherein the well trajectories include a plurality of well trajectories for potential wells in at least one subterranean reservoir, and wherein each well trajectory of the plurality of well trajectories corresponds to different sets of static geological data, dynamic outputs, and well production rates.

Example 19 is the non-transitory computer-readable medium of any of examples 16-18, wherein the estimated well production rates are production rates for at least one well location included in at least one subterranean reservoir.

Example 20 is the non-transitory computer-readable medium of any of examples 16-19, wherein the trained artificial neural network comprises a trained recurrent neural network or a trained deep neural network.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a non-transitory computer-readable medium comprising instructions that are executable by the processor to cause the processor to perform operations comprising:
   receiving a set of static geological data that includes indications of permeability and porosity of at least one subterranean reservoir in a subterranean formation;
   applying a trained convolutional neural network to the set of static geological data and initial states of dynamic reservoir properties to determine dynamic outputs that include reservoir pressure and reservoir fluid saturations of at least one subterranean reservoir;

determining well data by extracting the set of static geological data and the dynamic outputs at well trajectories; and applying a trained artificial neural network to the well data and subterranean grid information of at least one subterranean reservoir to generate estimated well production an injection rates for use in controlling a wellbore operation.

2. The system of claim 1, wherein the instructions are further executable by the processor to cause the processor to perform operations comprising:

accessing an untrained convolutional neural network;

accessing static data that includes indications of permeability and porosity, fluid property data, and rock property data of a portion of at least one subterranean reservoir, and dynamic outputs that include pressure and saturations of the portion of at least one subterranean reservoir; and training the untrained convolutional neural network by iteratively processing and mapping the static data to the dynamic outputs.

3. The system of claim 2, wherein the dynamic outputs are generated by applying a full-physics flow model to the static data of the portion of at least one subterranean reservoir.

4. The system of claim 2, wherein the instructions are further executable by the processor to cause the processor to perform operations comprising:

accessing an untrained artificial neural network;

accessing well static data that includes indications of permeability and porosity extracted at well trajectories from the set of static geological data of the portion of the at least one subterranean reservoir, well dynamic outputs that include pressure and saturation extracted at well trajectories from the dynamic outputs of the portion of the at least one subterranean reservoir, subterranean grid information of the portion of the at least one subterranean reservoir, production rates that include cumulative oil production, cumulative water production, oil production rate, and water production rate of the portion of the at least one subterranean reservoir, and injection rates that include cumulative oil injection, cumulative water injection, oil injection rate, and water injection rate of the portion of at least one subterranean reservoir; and training the untrained artificial neural network by iteratively processing and mapping the well static data, the well dynamic outputs, and the subterranean grid information to the production rates.

5. The system of claim 1, wherein the subterranean grid information comprises a directional well transmissibility, a reference pore volume, simulation time, grid assignments of fluid, rock, capillary pressure, and relative permeability properties, or a combination thereof.

6. The system of claim 1, wherein the well trajectories include a plurality of well trajectories for potential wells in at least one subterranean reservoir, and wherein each well trajectory of the plurality of well trajectories corresponds to different sets of static geological data, dynamic outputs, and well production and injection rates.

7. The system of claim 1, wherein the estimated well production rates are production rates and injection for at least one well location included in at least one subterranean reservoir.

8. The system of claim 1, wherein the trained artificial neural network comprises a trained recurrent neural network or a trained deep neural network.

9. A method comprising:

receiving a set of static geological data that includes indications of permeability and porosity of at least one subterranean reservoir in a subterranean formation;

applying a trained convolutional neural network to the set of static geological data and initial states of dynamic reservoir parameters to determine dynamic outputs that include reservoir pressure and reservoir fluid saturations of tat least one subterranean reservoir;

determining well data by extracting the set of static geological data and the dynamic outputs at well trajectories; and applying a trained artificial neural network to the well data and subterranean grid information of at least one subterranean reservoir to generate estimated well production rates for use in controlling a wellbore operation.

10. The method of claim 9, further comprising:

accessing an untrained convolutional neural network;

accessing static data that includes indications of permeability and porosity, fluid property data, and rock property data of a portion of the at least one subterranean reservoir, and dynamic outputs that include pressure and saturations of the portion of the at least one subterranean reservoir; and training the untrained convolutional neural network by iteratively processing and mapping the static data to the dynamic outputs.

11. The method of claim 10, wherein the dynamic outputs are generated by using a full-physics flow model that uses the static data as inputs.

12. The method of claim 10, further comprising:

accessing an untrained artificial neural network;

accessing well static data that includes indications of permeability and porosity extracted at well trajectories from the set of static geological data of the portion of at least one subterranean reservoir, well dynamic outputs that include pressure and saturations extracted at well trajectories from the dynamic outputs of the portion of the at least one subterranean reservoir, subterranean grid information of the portion of the at least one subterranean reservoir, production rates that include cumulative oil production, cumulative water production, oil production rate, and water production rate of the portion of the at least one subterranean reservoir, and injection rates that include cumulative gas injection, cumulative water injection, gas injection rate, and water injection rate of the portion of the at least one subterranean reservoir; and training the untrained artificial neural network by iteratively processing and mapping the well static data, the well dynamic outputs, and the subterranean grid information to the production rates.

13. The method of claim 9, wherein the subterranean grid information comprises a directional well transmissibility, a reference pore volume, simulation time, grid assignments of fluid, rock, capillary pressure, and relative permeability properties, or a combination thereof.

14. The method of claim 9, wherein the well trajectories include a plurality of well trajectories for potential wells in at least one subterranean reservoir, and wherein each well trajectory of the plurality of well trajectories corresponds to different sets of static geological data, fluid, rock, capillary pressure, and relative permeability data, dynamic outputs, and well production rates.

15. The method of claim 9, wherein the estimated well production rates are production rates for at least one well location included in the at least one subterranean reservoir, and wherein the trained artificial neural network comprises a trained recurrent neural network or a trained deep neural network.

16. A non-transitory computer-readable medium comprising program code that is executable by a processor for causing the processor to:

execute a trained convolutional neural network on a set of static geological data of at least one subterranean reservoir for determining dynamic outputs of at least one subterranean reservoir; and execute a trained artificial neural network on well static data extracted from the set of static geological data at well trajectories of at least one subterranean reservoir, well dynamic outputs extracted from the dynamic outputs at the well trajectories, and subterranean grid information of at least one subterranean reservoir for determining estimated well production and injection rates of at least one subterranean reservoir for use in controlling a wellbore operation.

17. The non-transitory computer-readable medium of claim 16, further comprising program code that is executable by the processor for causing the processor to train:

a convolutional neural network using static data of a portion of at least one subterranean reservoir and dynamic outputs of the portion of at least one subterranean reservoir from a full-physics flow model to generate the trained convolutional neural network; and an artificial neural network using well static data that is extracted at well trajectories from the static data of the portion of at least one subterranean reservoir extracted, well dynamic outputs that are extracted at well trajectories from the dynamic outputs of the portion of at least one subterranean reservoir, subterranean grid information of the portion of at least one subterranean reservoir, historical well production rate data of the portion of at least one subterranean reservoir, and historical well injection rate data of the portion of at least one subterranean reservoir to generate the trained artificial neural network.

18. The non-transitory computer-readable medium of claim 16, wherein the well trajectories include a plurality of well trajectories for potential wells in at least one subterranean reservoir, and wherein each well trajectory of the plurality of well trajectories corresponds to different sets of static geological data, dynamic outputs, and well production rates.

19. The non-transitory computer-readable medium of claim 16, wherein the estimated well production rates are production rates for at least one well location included in at least one subterranean reservoir.

20. The non-transitory computer-readable medium of claim 16, wherein the trained artificial neural network comprises a trained recurrent neural network or a trained deep neural network.

* * * * *